US009441775B2

(12) United States Patent
Kimura

(10) Patent No.: US 9,441,775 B2
(45) Date of Patent: Sep. 13, 2016

(54) HYDRAULIC JOINT STRUCTURE, HYDRAULICALLY-ACTUATED DEVICE INCLUDING HYDRAULIC JOINT STRUCTURE, JOINT PORTION CONSTITUTING HYDRAULIC JOINT STRUCTURE, HYDRAULIC PRESSURE GENERATING UNIT INCLUDING JOINT PORTION, END TOOL UNIT INCLUDING JOINT PORTION, AND HYDRAULIC HOSE UNIT INCLUDING JOINT PORTION

(75) Inventor: Kiyoshi Kimura, Fujisawa (JP)

(73) Assignee: Kabushiki Kaisha Ogura, Ebina-Shi (JP)

( * ) Notice: Subject to any disclaimer, the term of this patent is extended or adjusted under 35 U.S.C. 154(b) by 348 days.

(21) Appl. No.: 14/112,402

(22) PCT Filed: Apr. 16, 2012

(86) PCT No.: PCT/JP2012/060282
§ 371 (c)(1),
(2), (4) Date: Oct. 17, 2013

(87) PCT Pub. No.: WO2012/144465
PCT Pub. Date: Oct. 26, 2012

(65) Prior Publication Data
US 2014/0034149 A1    Feb. 6, 2014

(30) Foreign Application Priority Data

Apr. 18, 2011   (JP) ................. 2011-092284

(51) Int. Cl.
*F16L 37/32*  (2006.01)
*F16L 37/56*  (2006.01)
(Continued)

(52) U.S. Cl.
CPC ............... *F16L 37/32* (2013.01); *B25F 3/00* (2013.01); *B25F 5/005* (2013.01); *F16L 37/34* (2013.01);
(Continued)

(58) Field of Classification Search
CPC ......... F16L 37/22; F16L 37/34; F16L 37/35; F16L 37/38; F16L 37/367; F16L 37/42; F16L 37/56; F16L 37/565; F16L 29/04; F16L 39/005; F16L 39/00; F16L 39/02
See application file for complete search history.

(56) References Cited

U.S. PATENT DOCUMENTS 4,285,364 A * 8/1981 Hawker .................. F16L 37/23
137/614.03
5,482,082 A * 1/1996 Turner .................. F16L 17/035
137/614.03

(Continued)

FOREIGN PATENT DOCUMENTS

JP    62-272919 A1    11/1987
JP    05-037796 B2     6/1993
(Continued)

OTHER PUBLICATIONS

Extended European Search Report (Application No. 12774904.2) dated May 8, 2015.

(Continued)

*Primary Examiner* — Nathaniel Wiehe
*Assistant Examiner* — Michael Quandt
(74) *Attorney, Agent, or Firm* — Burr & Brown, PLLC

(57) ABSTRACT

When a male member is inserted into a female member to connect a first joint portion of a hydraulic joint structure and a second joint portion thereof, a first open end portion of a first oil passage of the male member and a first open end portion of a first oil passage of the female member are connected at a first axial position, and a second open end portion of a second oil passage of the male member and a second open end portion of a second oil passage of the female member are connected at a second axial position. Thus, two hydraulic oil lines can be easily connected at the same time.

9 Claims, 9 Drawing Sheets

(51) Int. Cl.
  *F16L 39/00* (2006.01)
  *F16L 37/34* (2006.01)
  *B25F 5/00* (2006.01)
  *B25F 3/00* (2006.01)
  F16L 37/35 (2006.01)
  F16L 37/367 (2006.01)
  A62B 3/00 (2006.01)
  B23D 17/06 (2006.01)
  B23D 29/00 (2006.01)

(52) U.S. Cl.
  CPC ................ *F16L 37/56* (2013.01); *F16L 39/00* (2013.01); *A62B 3/005* (2013.01); *B23D 17/06* (2013.01); *B23D 29/002* (2013.01); *F16L 37/35* (2013.01); *F16L 37/367* (2013.01); *Y10T 137/598* (2015.04)

(56) References Cited

U.S. PATENT DOCUMENTS 7,584,764 B2 * 9/2009 Maldavs ................ F16L 37/34
                                                        137/15.18
2005/0223886 A1    10/2005 Oide

FOREIGN PATENT DOCUMENTS

| JP | 2004-017202 A1 | 1/2004 |
| JP | 2005-114150 A1 | 4/2005 |
| JP | 2005-201285 A1 | 7/2005 |

OTHER PUBLICATIONS

Partial European Search Report (Application No. 12774904.2) dated Jan. 20, 2015.
International Search Report dated Jun. 12, 2012.

* cited by examiner

HYDRAULIC JOINT STRUCTURE, HYDRAULICALLY-ACTUATED DEVICE INCLUDING HYDRAULIC JOINT STRUCTURE, JOINT PORTION CONSTITUTING HYDRAULIC JOINT STRUCTURE, HYDRAULIC PRESSURE GENERATING UNIT INCLUDING JOINT PORTION, END TOOL UNIT INCLUDING JOINT PORTION, AND HYDRAULIC HOSE UNIT INCLUDING JOINT PORTION

BACKGROUND OF THE INVENTION

1. Field of the Invention

The present invention relates to improvement in a hydraulic joint structure used in a hydraulically-actuated device.

2. Description of Related Art

Rebar cutters and rebar benders have been conventionally known as a portable hydraulic tool (hydraulically-actuated device). Such a hydraulic tool includes, for example, a battery-driven hydraulic pump unit (hydraulic pressure generating unit) and an end tool unit (head unit) such as a cutter unit or a bending unit that is driven by a pressurized hydraulic oil supplied from the hydraulic pump unit. Recently, such a hydraulic tool is used also as a rescue tool. In order to allow the hydraulic pump unit to be shared by various end tool units, the hydraulic pump unit and the end tool unit can be connected and separated to and from each other. In addition, in order to reduce the weight load on an operator who accesses a work object, the hydraulic pump unit and the end tool unit are connected through a relatively long hydraulic hose unit. In this case, a main operator holds and operates the end tool unit, and a sub operator holds and operates the hydraulic pump unit.

The aforementioned portable hydraulic tool is classified into a single-acting type (in which only the forward action is performed hydraulically, while the backward action is performed by a return spring) and a double-acting type (in which both the forward and backward actions are performed hydraulically). In a double-acting portable hydraulic tool, two hydraulic oil lines are provided between the hydraulic pump unit and the end tool unit. One of the hydraulic oil lines is used for feeding pressurized hydraulic oil to the end tool unit, and the other is used for return oil. In a case that the portable hydraulic tool is composed of a plurality of connectable/separable units as described above, the hydraulic oil lines (oil passages) must be connected/separated. To this end, couplers or joints for constituting a hydraulic joint structure are provided on the respective units.

An example of a hydraulic joint structure for a double-acting hydraulic tool, which includes a plurality of connectable/separable units, is disclosed in Patent Document 1 (Publication of Examined Patent Application No. JPH05-037796B2), Patent Document 1 describes that two holes into which both a porting connector and a coupler can be inserted are provided in an end surface of each unit, and two hydraulic oil lines are connected by using two porting connectors, with the end surfaces of the two units being abutted with each other; or a male coupler and a female coupler are engaged with the holes by screw fastening, and the couplers are connected with each other when two units are joined.

In the system disclosed in Patent Document 1, either when a porting connector is used or when a coupler is used, two pairs of members must be positioned accurately at the same time, which complicates the joining operation. When a porting connector is used, hydraulic oil in oil passages leaks outside upon separation of the units. When a coupler is used, the leakage problem can be avoided. However, if a pump unit is operated by mistake when the two units are separated, pressurized hydraulic oil may spout, or the pump unit may be damaged.

SUMMARY OF THE INVENTION

The present invention provides a hydraulic joint structure capable of easily connecting two hydraulic oil lines at the same time.

In a preferred embodiment of the present invention, there is provided a hydraulic joint structure capable of preventing leakage of hydraulic oil, when the hydraulic joint structure is in a separated condition.

In a preferred embodiment of the present invention, there is provided a hydraulic joint structure capable of preventing spout of a hydraulic oil or damage of a hydraulic pressure generating unit, even when the hydraulic pressure generating unit is operated while a hydraulic joint structure is in a separated condition.

According to the present invention, there is provided a hydraulic joint structure comprising a first joint portion and a second joint portion releasably connected with the first joint portion, wherein: the first joint portion has a first oil passage and a second oil passage; the second joint portion has a first oil passage and a second oil passage; the first joint portion has a cylindrical male member; the second joint portion has a female member with a cylindrical hole into which the male member of the first joint portion is inserted; the first oil passage of the first joint portion extends in the male member of the first joint portion and has a first open end portion opening into an outer circumference of the male member at a first axial position of the male member; the second oil passage of the first joint portion extends in the male member of the first joint portion and has a second open end portion opening into an outer circumference of the male member at a second axial position of the male member; the first oil passage of the second joint portion extends in the female member of the second joint portion and has a first open end portion opening into an inner circumference of the female member at a first axial position of the female member; the second oil passage of the second joint portion extends in the female member of the second joint portion and has a second open end portion opening into an inner circumference of the female member at a second axial position of the female member; and when the male member is inserted into the cylindrical hole of the female member to join the first joint portion and the second joint portion, the first open end portion of the first oil passage of the male member and the first open end portion of the first oil passage of the female member are connected at a first axial position of said hydraulic joint structure corresponding to the first axial position of the male member and the female member to form a first connection, and the second open end portion of the second oil passage of the male member and the second open end portion of the second oil passage of the female member are connected at a second axial position of said hydraulic joint structure corresponding to the second axial position of the male member and the female member to form a second connection.

In a preferred embodiment, the first open end portion of the male member and the first open end portion of the female member are connected through a first circumferential groove, the first circumferential groove is one extending in the outer circumference of the male member in a circumferential direction at the first axial position of the male member, or one extending in the inner circumference of the male member in a circumferential direction at the first axial position of the female member; and the second open end portion of the male member and the second open end portion of the female member are connected through a second circumferential groove, the second circumferential groove is one extending in the outer circumference of the male member in a circumferential direction at the second axial position of the male member, or one extending in the inner circumference of the female member in a circumferential direction at the second axial position of the female member.

In a preferred embodiment, the hydraulic joint structure further comprises a ring member, which has a cylindrical hole into which the male member of the first joint portion is inserted and which is movable between an oil passage-covering position and a retracted position along an axial direction of the male member, wherein: the ring member is biased toward the oil passage-covering position by a spring; the ring member has an inner circumference provided therein with a communication groove; when the first joint portion and the second joint portion are separated from one another, the ring member is positioned at the oil passage-covering position to connect via the communication groove the first open end portion of the first oil passage of the male member and the second open end portion of the second oil passage of the male member; and when the first joint portion and the second joint portion are connected with each other, the second joint portion pushes the ring member into the retracted position against a force of the spring.

In a preferred embodiment, the hydraulic joint structure further comprises a cylindrical member provided in the cylindrical hole of the female member of the second joint portion so as to be axially movable between an oil passage-covering position and a retracted position, wherein: the cylindrical member is biased toward the oil passage-covering position by a spring; when the first joint portion and the second joint portion are separated from one another, the cylindrical member is positioned at the oil passage-covering position of the cylindrical member to close the first open end portion of the first oil passage of the female member and the second open end portion of the second oil passage of the female member; and when the first joint portion and the second joint portion are connected with each other, the mail member pushes the cylindrical member into the retracted position of the cylindrical member against a force of the spring.

Furthermore, the present invention provides (1) a hydraulically-actuated device including the aforementioned hydraulic joint structure, (2) a first joint portion and a second joint portion constituting the aforementioned hydraulic joint structure and (3) a hydraulic pressure generating unit, an end tool unit and a hydraulic hose unit, which are constituent units of a hydraulically-actuated device, each including such a joint portion.

According to the present invention, since the two oil passages can be connected at the same time only by inserting the male member into the female member, a connecting operation is easy. In addition, in a preferred embodiment in which the ring member having an inner circumference provided therein with a communication groove is disposed above the male member, leakage of hydraulic oil can be prevented while the hydraulic joint structure is in a separated condition.

DETAILED DESCRIPTION OF THE INVENTION

A hydraulic rescue tool as one embodiment of a hydraulically-actuated device will be described herebelow with reference to the accompanying drawings. Oil passages shown in the accompanying drawings are formed by drilling a solid material with a drill to form a plurality of linear holes, connecting crosswise the linear holes according to need, and/or closing the end portions of the holes with plugs according to need. Since the specific method for forming the oil passages can be readily understood by those skilled in the art only from the accompanying drawings, the method is not described in the specification. It goes without saying that the hydraulically-actuated device may be a hydraulic tool, such as a rebar cutter or a rebar bender, which has been widely used in the construction industry.

Figure 1:
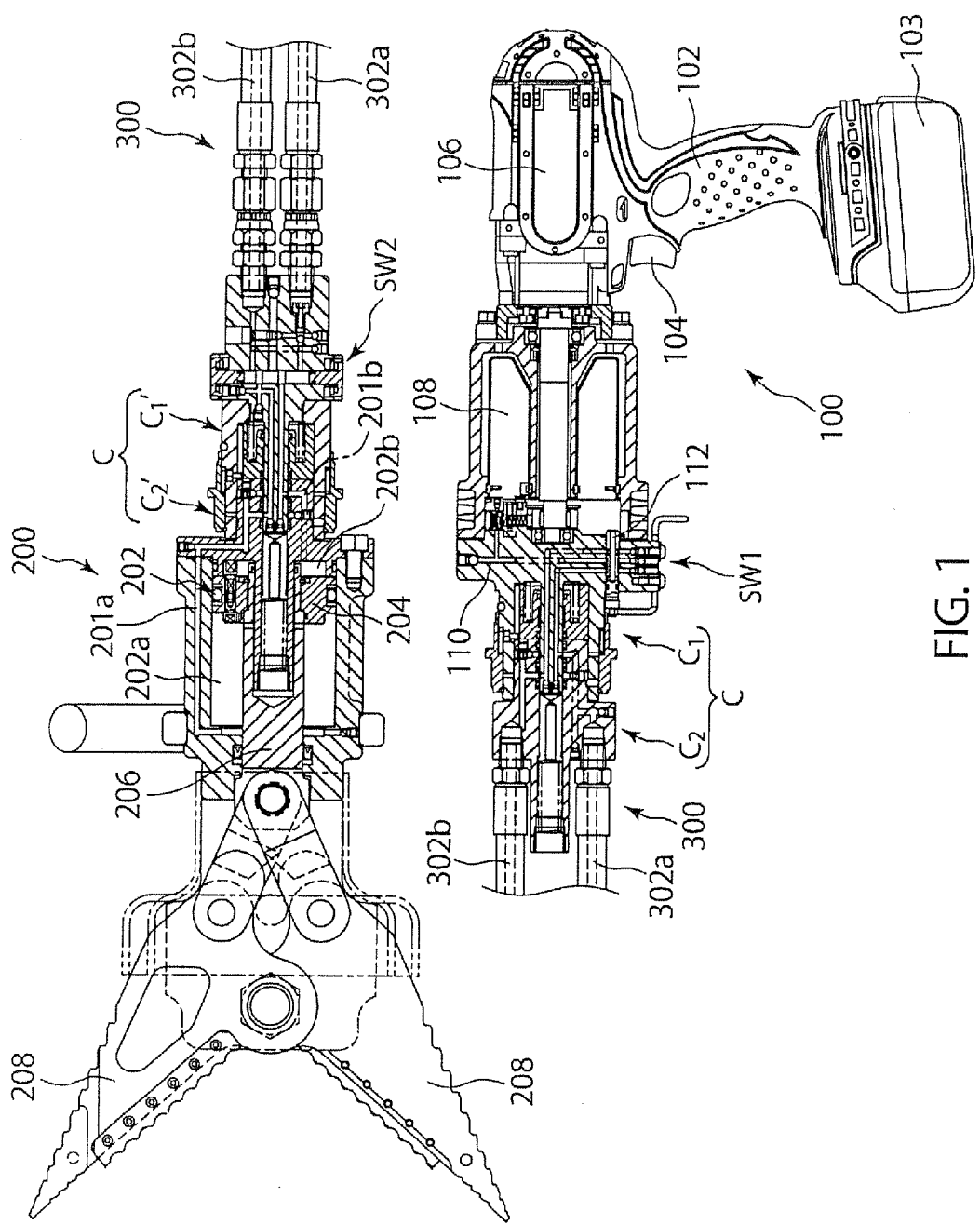
FIG. 1 is a cross sectional view showing the structure of an embodiment of a hydraulically-actuated device.
Figure 2:
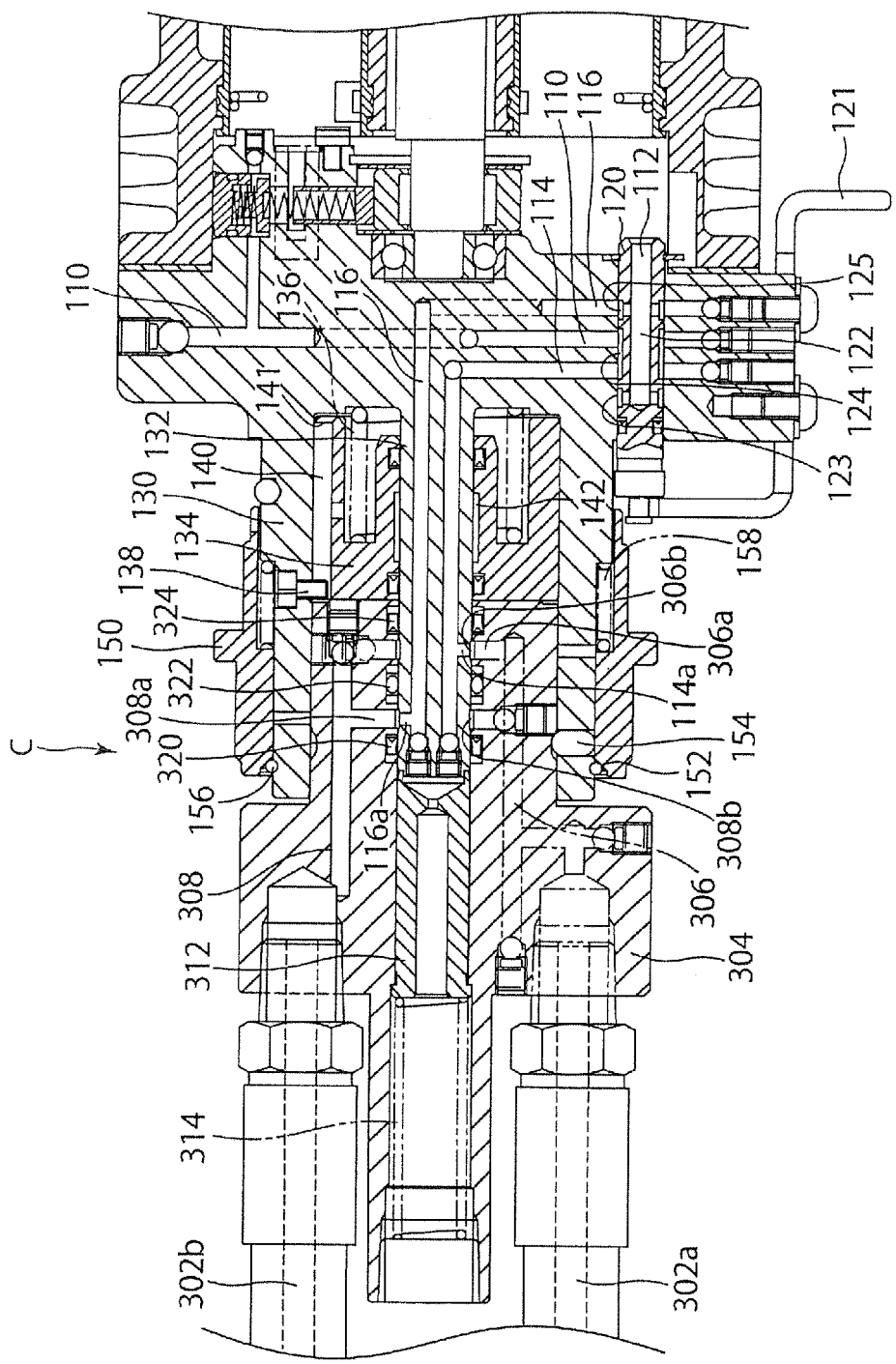
FIG. 2 is a cross sectional view of a part of FIG. 1 in enlargement, showing the connected condition of a hydraulic joint structure between a hydraulic pressure generating unit and a hydraulic hose unit in the hydraulically-actuated device shown in FIG. 1.

As shown in FIGS. 1 and 2, the hydraulic rescue tool is composed of: a hydraulic pressure generating unit 100; a double-acting end tool unit 200 (which is also called "head unit") which is a spreader in this embodiment and which is driven by a hydraulic pressure generated by the hydraulic pressure generating unit 100; and a hydraulic hose unit (hereinafter referred to simply as "hose unit") 300 that connects the hydraulic pressure generating unit 100 and the end tool unit 200 with each other. The hydraulic pressure generating unit 100 and the hose unit 300 can be connected and separated to and from each other. In addition, the end tool unit 200 and the hose unit 300 can be connected and separated to and from each other. As described below, the hydraulic pressure generating unit 100 and the end tool unit can be directly connected with each other, without using the hose unit 300.

Figure 3:
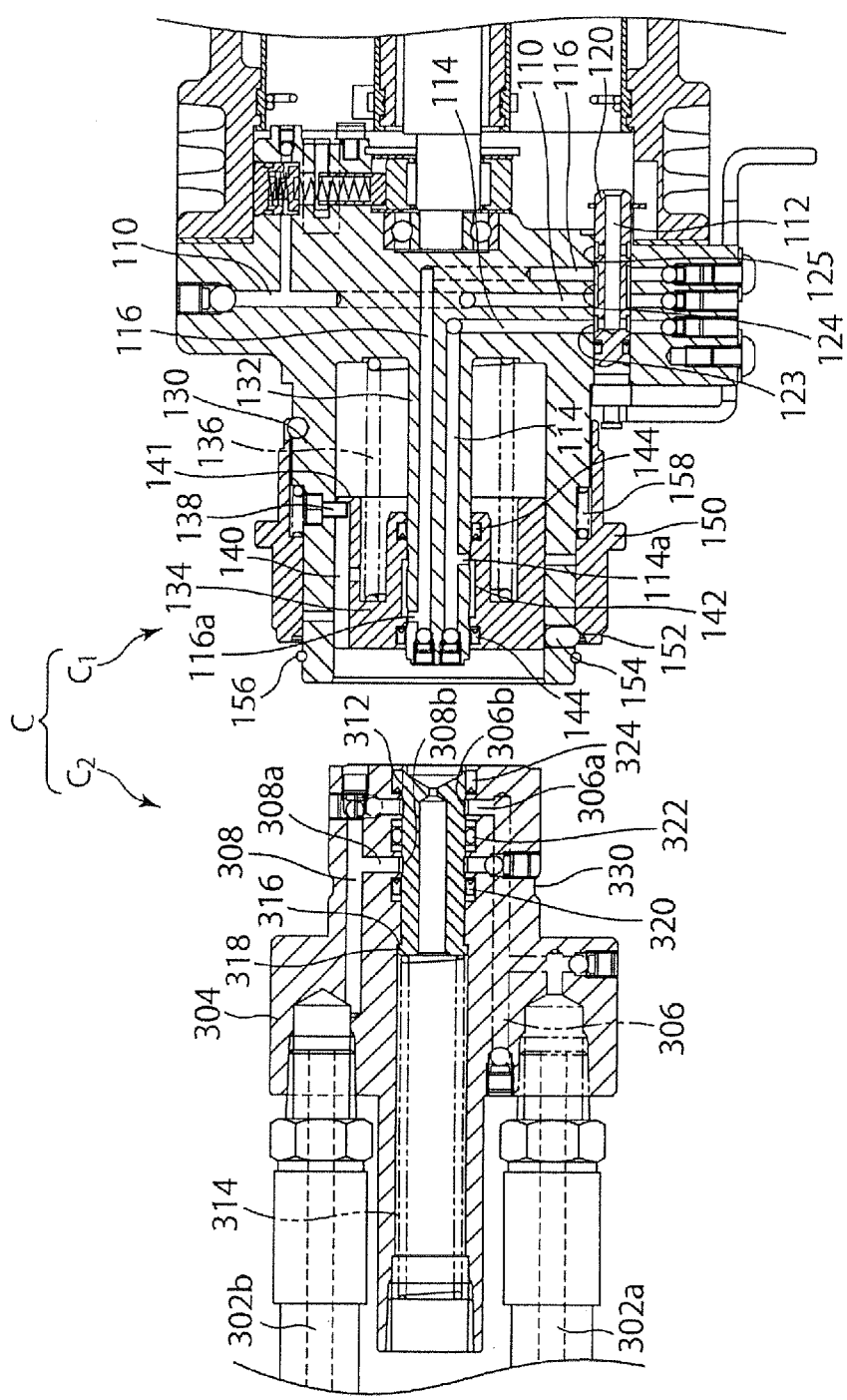
FIG. 3 is a cross sectional view showing the separated condition of the hydraulic joint structure shown in FIG. 2.

FIG. 1 shows the condition in which the hydraulic pressure generating unit 100, the end tool unit 200 and the hose unit 300 are connected. FIG. 2 shows, in enlargement, a hydraulic joint structure C that connects the hydraulic pressure generating unit 100 and the hose unit 300 with each other. FIG. 3 shows the condition in which the hydraulic pressure generating unit 100 and the hose unit 300 are separated from each other.

As shown in FIG. 1, the hydraulic pressure generating unit 100 comprises a battery-powered electrohydraulic pump unit. The hydraulic pressure generating unit 100 includes a grip 102 provided with a trigger switch 104. When the trigger switch 104 is pulled, an electric motor 106 (invisible in FIG. 1) incorporated in the hydraulic pressure generating unit 100 operates to rotate a pump 108, so that a pressurized hydraulic oil is fed to an oil discharge passage 110. Then, the hydraulic oil is returned to the pump 108 through an oil return passage 112. A battery 103 as an electric power source for driving the electric motor 106 is mounted on the lower end of the grip 102.

The spreader as the end tool unit 200 is a double-acting tool unit including a double-acting hydraulic cylinder 202. Namely, both the opening operation and closing operation of the spreader are performed hydraulically. When pressurized hydraulic oil fed from a first oil passage 201a into a first chamber 202a of the hydraulic cylinder 202, a piston 204 and a rod 206 fixed to the piston 204 are moved rightward in FIG. 1, so that a pair of blades 208 of the spreader 200 are opened and that hydraulic oil in a second chamber 202b is pushed out therefrom through a second oil passage 201b. On the other hand, when pressurized hydraulic oil is fed into the second chamber 202b, the piston 204 and the rod 206 are moved leftward in FIG. 1, so that the pair of blades 208 of the spreader 200 are closed, and that hydraulic oil in the first chamber 202a is pushed out therefrom.

The hose unit 300 includes a pair of hydraulic hoses 302a and 302b. When the hose unit 300 is connected with the end tool unit 200, the hydraulic hoses 302a and 302b and the chambers 202a and 202b are respectively connected with each other. The relation of connection can be switched and interrupted by a second switch mechanism SW2 (described later).

The hydraulic pressure generating unit 100 and the hose unit 300 are connected by the hydraulic joint structure C. When the hydraulic pressure generating unit 100 and the hose unit 300 are connected with each other, the oil discharge passage 110 formed in a body of the hydraulic pressure generating unit 100 can be communicated with either one of the two hydraulic hoses 302a and 302b of the hose unit 300, depending on the condition of a first switch mechanism SW1. The first switch mechanism SW1 is described herebelow.

FIG. 2 shows the condition in which pressurized hydraulic oil is supplied from the oil discharge passage 110 of the pump 108 to the first hydraulic hose 302a. A cylindrical spool valve element 120 is axially-slidably fitted in a spool valve hole formed in the body of the hydraulic pressure generating unit 100. An inside space 122 extending axially in the spool valve element 120 defines the aforementioned oil return passage 112 for returning hydraulic oil to the pump 108. The spool valve element 120 can be displaced by moving a lever 121 by a finger of a user. Herebelow, the position of the spool valve element 120 shown in FIG. 2 is referred to as "first position" in this specification.

In addition to the aforementioned oil discharge passage 110, a first oil passage 114 and a second oil passage 116 are formed in the body of the hydraulic pressure generating unit 100. The oil passages 114, 110 and 116 open into an inner circumference of the spool valve hole in which the spool valve member 120 is inserted, which oil passages are spaced at equal intervals along the axial direction of the spool valve hole. An outer circumference of the spool valve element 120 is provided with three circumferential grooves 123, 124 and 125 which are arranged in the axial direction of the spool valve element 120. The spool 120 has radial holes that connect the narrower circumferential grooves 123 and 125 on both sides with the inside space 122 serving as the oil return passage 112. The middle circumferential groove 124 has such a large width that the groove 124 can communicate adjacent two oil passages (110 and 114, or 110 and 116) with each other depending on the axial position of the spool valve element 120.

In the condition shown in FIG. 2 in which the spool valve element 120 is positioned at the "first position", the oil discharge passage 110 is connected with the first oil passage 114 through the circumferential groove 124 of the spool valve element 120. The second oil passage 116 is connected with the inside space 122 of the spool valve element 120, i.e., the oil return passage 112, through the circumferential groove 125 of the spool valve element 120 and the radial hole connected with the circumferential groove 125.

When the spool valve element 120, which has been positioned at the first position shown in FIG. 2, is displaced rightward in FIG. 2 by a predetermined distance (i.e., the distance equal to an interval of the adjacent oil passages 114, 110, 116) such that the spool valve element 120 is placed at its "second position" (see FIG. 3), the circumferential groove 123 of the spool valve element 120 is connected with the first oil passage 114, while the oil discharge passage 110 and the second oil passage 116 are connected with each other by the middle, wider circumferential groove 124.

Thus, at this time, the oil discharge passage 110 is connected with the second oil passage 116 through the circumferential groove 124 of the spool 120; and the first oil passage 114 is connected with the inside space 122 of the spool 120, i.e., the oil return passage 112, through the circumferential groove 123 of the spool 120 and the radial hole connected with the circumferential groove 123.

Next, the hydraulic joint structure C for joining the hydraulic pressure generating unit 100 and the hydraulic hose unit 300, is described with reference to FIGS. 2 and 3. The hydraulic joint structure C includes a first joint portion C1 and a second joint portion C2 that are configured to be connectable and separable to and from each other. The first joint portion C1 is disposed on an end of the hydraulic pressure generating unit 100, and the second joint portion C2 is disposed on an end of the hydraulic hose unit 300 on the side of the hydraulic pressure generating unit 100.

The first joint portion C1 has an outer cylinder 130 having generally a shape of a cylindrical sleeve and a mandrel 132 (i.e., a male member of the first joint portion C1) having a shape of a cylindrical column, which are parts of the body of the hydraulic pressure generating unit 100. The central axis of the outer cylinder 130 and a central axis of the mandrel 132 coincide with each other. A ring member 134 having a shape of cylindrical sleeve is provided in a space, which has a shape of a circular ring and is defined between an inner circumference of the outer cylinder 130 and an outer circumference of the mandrel 132. The ring member 134 is axially movable (slidable), with its inner circumference being guided by the outer circumference of the mandrel 132 and its outer circumference being guided by the inner circumference of the outer cylinder 130. The ring member 134 is biased leftward in the drawings by a spring 136. As shown in FIG. 3, when the hydraulic pressure generating unit 100 and the hydraulic hose unit 300 are separated from each other, the ring member 134 is positioned at an "oil passage-covering position" where the ring member 134 prevents leakage of hydraulic oil from the oil passages. A stopper 138, which comprises a bolt in the illustrated example, is provided to properly position the ring member 134 at the "oil passage-covering position". The stopper 138 is received in an axial groove 140 formed in the outer circumference of the ring member 134. When the ring member 134 is positioned at the "oil passage-covering position", the stopper 138 is in contact with a stop surface 141 provided on an end portion of the ring member 134 (see FIG. 3).

The aforementioned first oil passage 114 and the second oil passage 116 axially extend in the cylindrical mandrel 132, i.e., the male member. The first oil passage 114 has an open end portion 114*a* opening into the outer circumference of the mandrel 132 at a first axial position of the mandrel 132. The second oil passage 116 has an open end portion 116*a* opening into the outer circumference of the mandrel 132 at a second axial position of the mandrel 132 (i.e., a position on the left side of the first axial position in the illustrated example). A circumferential groove 142 is formed in the inner circumference of the ring member 134. The circumferential groove 142 is configured such that, when the ring member 134 is positioned at the "oil passage-covering position", the circumferential groove 142 occupies such a position and has such a width that allow the open end portion 114*a* and the open end portion 116*a* to be communicated with each other. Ring-shaped seal members 144 are provided on the inner circumference of the ring member 134, on both sides of the circumferential groove 142. Thus, when the ring member 134 is positioned at the "oil passage-covering position", leakage of hydraulic oil from the open end portions 114*a* and 116*a* can be prevented by the pair of seal members 144. In addition, even when an operator pulls the trigger switch 104 by mistake, pressurized hydraulic oil having been fed from the pump 108 to the oil discharge passage 110 returns to the oil return passage 112 through the circumferential groove 142, regardless of the position of the spool 120 for switching the oil passages. Thus, there is no possibility that the hydraulic oil leaks beyond the seal members 144, whereby the pump 108 can be prevented from being damaged.

The second joint portion C2, which is provided on the end of the hydraulic hose unit 300 on the side of the hydraulic pressure generating unit 100, includes a generally cylindrical sleeve 304 (i.e., a female member of the second joint portion C2) having an axially-extending inside space formed in its central portion. In the sleeve 304, there are formed a first oil passage 306 in communication with a first hydraulic hose 302*a*, and a second oil passage 308 in communication with a second hydraulic hose 302*b*. The first oil passage 306 has an open end portion 306*a* opening into an inner circumference of the sleeve 304 at a first axial position of the sleeve 304. The second oil passage 308 has an open end portion 308*a* opening into the inner circumference of the sleeve 304 at a second axial position of the sleeve 304 (i.e., a position on the left side of the first axial position in the illustrated embodiment). A circumferential groove 306*b* in communication with the open end portion 306*a* is formed in the inner circumference of the sleeve 304 at the same axial position as that of the open end portion 306*a*. In addition, a circumferential groove 308*b* in communication with the open end portion 308*a* is formed in the inner circumference of the sleeve 304 at the same axial position as that of the open end portion 308*b*. The axial distance between the circumferential groove 306*a* and the circumferential groove 308*b* is the same as the axial distance between the open end portion 114*a* and the open end portion 116*a*, which are provided in the mandrel 132 of the first joint portion C1.

The diameter of the inner circumference of the sleeve 304 is slightly larger than the diameter of the mandrel 132 of the first joint portion C1 (like "loose fit"), so that the mandrel 132 can be smoothly inserted into the sleeve 304. A rod member 312 having a shape of a cylindrical column is disposed in the sleeve 304. The rod member 312 is axially movable (slidable) in the sleeve 304. The rod member 312 is biased rightward in the drawings by a spring 314. As shown in FIG. 3, when the hydraulic pressure generating unit 100 and the hydraulic hose unit 300 are separated from each other, the rod member 312 is positioned at an "oil passage-covering position" where the rod member 312 prevents leakage of hydraulic oil from the oil passages 306 and 308. A stopper 316, which comprises a step formed in the inner circumference of the cylindrical sleeve 304 in the illustrated embodiment, is provided to properly position the rod member 312 at the "oil passage-covering position". When the rod member 312 is positioned at the "oil passage-covering position", the stopper 316 is in contact with a stop surface 318, which comprises a surface of an enlarged diameter portion provided at an end portion of the rod member 312. When the rod member 312 is positioned at the "oil passage-covering position", the rod member 312 closes the open end portion 306*a* of the first oil passage 306 and the circumferential groove 306*b* in communication therewith, as well as the open end portion 308*a* of the second oil passage 308 and the circumferential groove 308*b* in communication therewith.

Three ring-shaped seal members 320, 322 and 324 are disposed on the inner circumference of the sleeve 304. The open end portion 306*a* of the first oil passage 306 (and the circumferential groove 306*b*) opens into the inner circumference of the sleeve 304 at the first axial position of the sleeve 304 between the seal member 322 and the seal member 324. The open end portion 308*a* of the second oil passage 308 (and the circumferential groove 308*b*) opens into the inner circumference of the sleeve 304 at the second axial position of the sleeve 304 between the seal member 320 and the seal member 322. When the rod member 312 is positioned at the "oil passage-covering position", leakage of hydraulic oil in the first oil passage 306 and the second oil passage 308 to the outside can be prevented by the seal members 320, 322 and 324.

Upon connection of the second joint portion C2 with the first joint portion C1, the condition shown in FIG. 3 will be changed into the condition shown in FIG. 2.

Namely, the mandrel 132 (i.e., male member) of the first joint portion C1 is inserted into the cylindrical inside space of the sleeve 304 (i.e., female member) of the second joint portion C2, so that the mandrel 132 pushes the rod member 312 leftward in FIG. 2, while compressing the spring 314. In addition, the end surface of the sleeve 304 pushes the ring member 134 rightward in FIG. 2, while compressing the spring 136. The positions of the ring member 134 and the rod member 312 in this condition are referred to as "retracted positions".

At this time, the first axial position of the outer circumference of the mandrel 132 and the first axial position of the inner circumference of the sleeve 304 are opposed to each other, and the second axial position of the outer circumference of the mandrel 132 and the second axial position of the inner circumference of the sleeve 304 are opposed to each other. At a first axial position of the hydraulic joint structure C, the open end portion 114*a* of the first oil passage 114 of the hydraulic pressure generating unit 100 and the open end portion 306a of the first oil passage 306 of the hydraulic hose unit 300 are connected via the circumferential groove 306b to form a first connection. In addition, at a second axial position of the hydraulic joint structure C, the open end portion 116a of the second oil passage 116 of the hydraulic pressure generating unit 100 and the open end portion 308a of the second oil passage 308 of the hydraulic hose unit 300 are connected via the circumferential groove 308b to form a second connection. Further, at this time, the seal members 320, 322 and 324 seal a gap between the outer circumference of the mandrel 132 and the inner circumference of the sleeve 304. The seal members 320 and 322 are positioned at both axial sides of the connection between the open end portion 114a, and the open end portion 306a and the circumferential groove 306b to seal the aforementioned first connection. The seal members 322 and 324 are positioned at both axial sides of the connection between the open end portion 116a, and the open end portion 308a and the circumferential groove 308b to seal the aforementioned second connection. Due to the provision of the circumferential grooves 306b and 308b, when the first joint portion C1 and the second joint portion C2 are joined, the relative angular position between the first joint portion C1 and the second joint portion C2 about their axes can be set arbitrarily. Namely, it is not necessary that the open end portion 114a (116a) is opposed to the open end portion 306a (308a). Thus, the connection operation can be significantly facilitated. Such a circumferential groove may be provided at a position of the open end portion 114a (116a) of the outer circumference of the mandrel 132, or may be provided in both the outer circumference of the mandrel 132 and the inner circumference of the sleeve 304.

A lock mechanism is provided for maintaining the connected condition of the second joint portion C2 and the first joint portion C1. The lock mechanism is described below. There is provided a lock ring 150 that is axially slidable along the outer circumference of the outer cylinder 130 of the first joint portion C1. A chamfered portion 152 is formed on an end portion of the lock ring 150. The outer cylinder 130 is provided with a plurality of (e.g., six to ten) radial holes, which pass radially through the outer cylinder 130 (in the thickness direction), and which are evenly distributed along the circumferential direction. A lock ball 154 of an elliptic cross section is held in each radial hole such that the lock ball 154 is movable in the radial direction of outer cylinder 130. An annular recess 330 adapted to receive the lock balls 154 is formed in the outer circumference of the sleeve 304 of the second joint portion C2. A radius of curvature of the surface of the annular recess 330 is relatively large, and thus the annular recess 330 has the surface of a relatively shallow slope. The lock ring 150 is biased toward a "lock position (see FIG. 2)", which is on the left side in the drawings, by a spring 158 disposed between the lock ring 150 and the outer cylinder 130.

In the condition shown in FIG. 3, since the ring member 134 prevents the lock balls 154 from moving radially inward, the lock ring 150 cannot move leftward in FIG. 3. As shown in FIG. 2, when the second joint portion C2 is connected with the first joint portion C1, the axial position of each lock ball 154 and the axial position of each annular recess 330 coincides with each other, whereby the lock ball 154 can move radially inward by a distance corresponding to the depth of the annular recess 330. Then, while the lock ring 150 is moved leftward in the drawings by a force of the spring 158, the chamfered portion 152 of the lock ring 150 pushes the lock balls 154 radially inward, and the lock ring 150 overrides the lock balls 154. In order to stop the lock ring 150 at a predetermined axial position ("lock position"), a stopper ring 156 is provided on the outer circumference of the outer cylinder 130. In the condition shown in FIG. 2, since the lock ring 150 prevents the lock balls 154 from moving radially outward, the connection between the second joint portion C2 and the first joint portion C1 is securely maintained. The connected condition between the second joint portion C2 and the first joint portion C1 can be released in the following manner. Namely, an operator moves the lock ring 150 rightward in the drawings against the spring 158 to allow the lock balls 154 to move radially outward. Under this condition, when the second joint portion C2 is drawn from the first joint portion C1, the lock balls 154 are moved radially outward while being guided by the surface of a relatively shallow slope of the annular recess 330.

Figure 4:
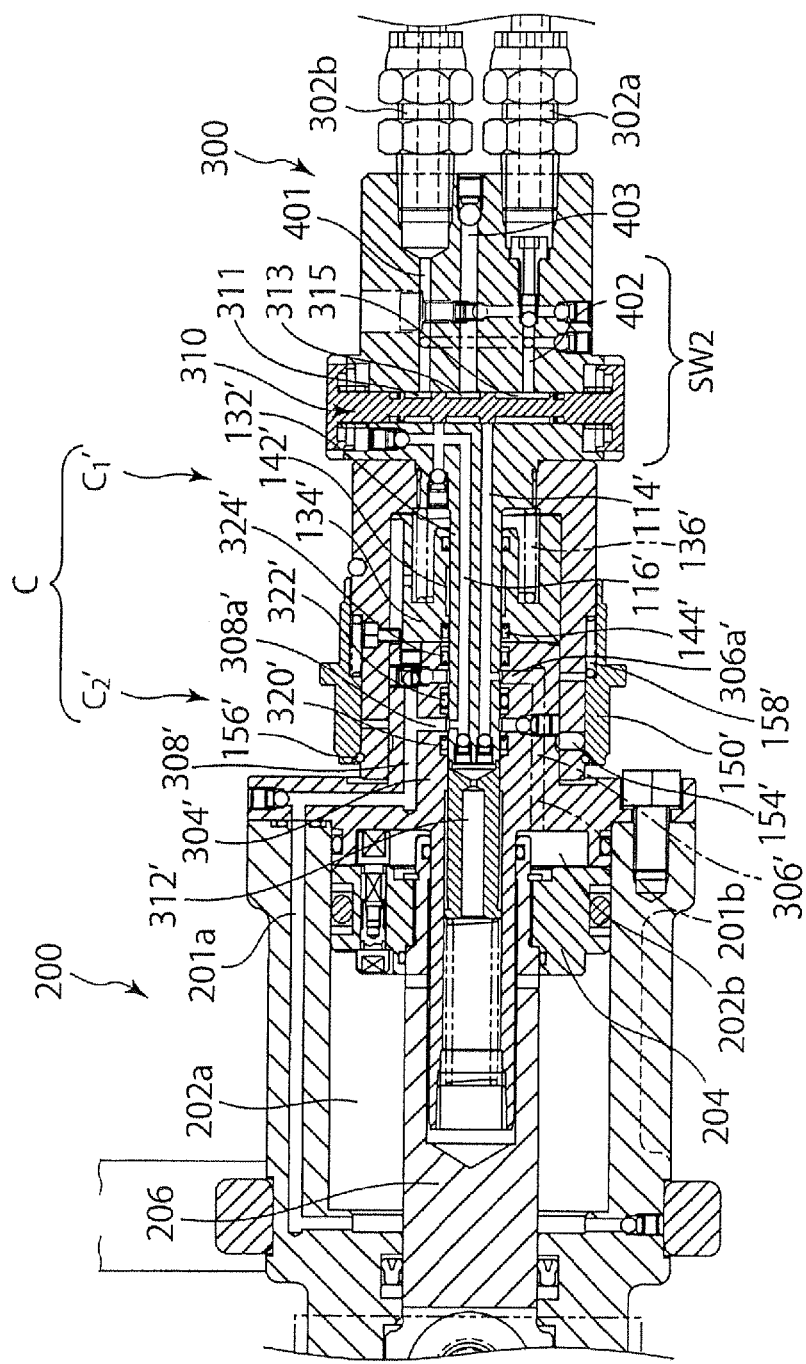
FIG. 4 is a cross sectional view of a part of FIG. 1 in enlargement, showing the connected condition of an end tool unit and the hydraulic hose unit in the hydraulically-actuated device shown in FIG. 1.
Figure 5:
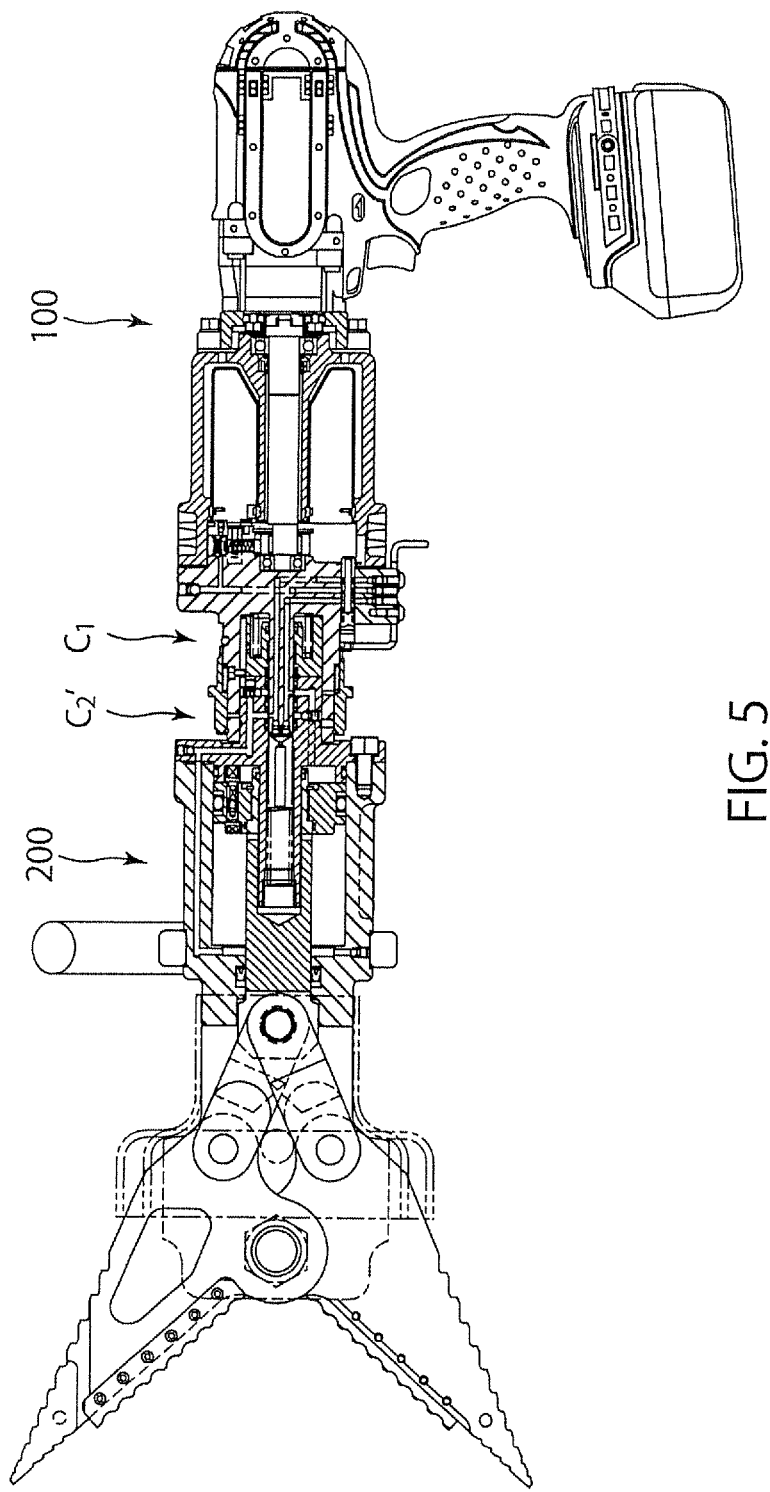
FIG. 5 is a cross sectional view showing the condition in which the hydraulic pressure generating unit and the end tool unit, which are shown in FIG. 1, are directly connected without using the hydraulic hose unit.

Heretofore, the hydraulic joint structure C between the hydraulic pressure generating unit 100 and the end of the hose unit 300 on the side of the hydraulic pressure generating unit 100 has been described. A hydraulic joint structure C' between the spreader as the end tool unit 200 and the end of the hose unit 300 on the side of the end tool unit 200 has the same structure. This is apparent from FIG. 4 showing the hydraulic joint structure C' in enlargement. In FIG. 4 showing the hydraulic joint structure C', the constituent members of the hydraulic joint structure C' corresponding to the constituent members of the hydraulic joint structure C are indicated by the same reference numbers but with the dash symbol ('). The fact that the hydraulic joint structures C and C' have the same structure means that the hydraulic pressure generating unit 100 can be directly connected with the end tool unit 200. Such a manner of use is also intended. FIG. 5 shows a condition in which the hydraulic pressure generating unit 100 is directly connected with the end tool unit 200.

As shown in FIGS. 1 and 6, an end piece (end member) of the hose unit 300 constituting the hydraulic joint structure C' on the side of the end tool unit 200 is provided with a switch mechanism SW2 between the joint portion C1' and the ends of the hydraulic hoses 302a and 302b. The switch mechanism SW2 performs a switching operation by which pressurized hydraulic oil is supplied to either one of the oil passage 114' and the oil passage 116' of the joint portion C2' of the end tool unit 200, under the condition in which the aforementioned switch mechanism SW1 is adjusted such that pressurized hydraulic oil is supplied to the hydraulic hose 302a and that return oil flows through the hydraulic hose 302b.

The structure and operation of the switch mechanism SW2 are described with reference particularly to FIG. 6. The switch mechanism SW2 includes a slide valve 310 having, in its outer circumference, circumferential grooves 311, 312 and 313. The slide valve 310 is slidable in an up and down direction in FIG. 6, and can take a first position shown in FIG. 6(a), a neutral position shown in FIG. 6(b) and a second position shown in FIG. 6(c). The switch mechanism SW2 is provided with a first oil passage 401 in communication with the hydraulic hose 302b, a second oil passage 402 in communication with the hydraulic hose 302a, and a third oil passage 403 disposed between the first oil passage 401 and the second oil passage 402 in parallel with the first oil passage 401 and the second oil passage 402. The first oil passage 401 and the second oil passage 402 are connected via a fourth oil passage 404. Hydraulic oil can freely flow in the fourth oil passage 404 upward and downward in FIG. 6. The second oil passage 402 and the third oil passage 403 are connected via a fifth oil passage 405. The fifth oil passage 405 is provided with a check valve 406, whereby hydraulic oil can flow in the fifth oil passage 405 only in the upward direction in FIG. 6. The second oil passage 402 is provided with a check valve 407, whereby hydraulic oil cannot flow leftward in FIG. 6 through the check valve 407 (hydraulic oil is allowed to flow rightward in FIG. 6 through the check valve 407). Thus, when pressurized hydraulic oil flows from the hydraulic hose 302a into the second oil passage 402, the hydraulic oil flows into the fifth oil passage 405 to flow therethrough in the upward direction in FIG. 6.

Figure 6A:
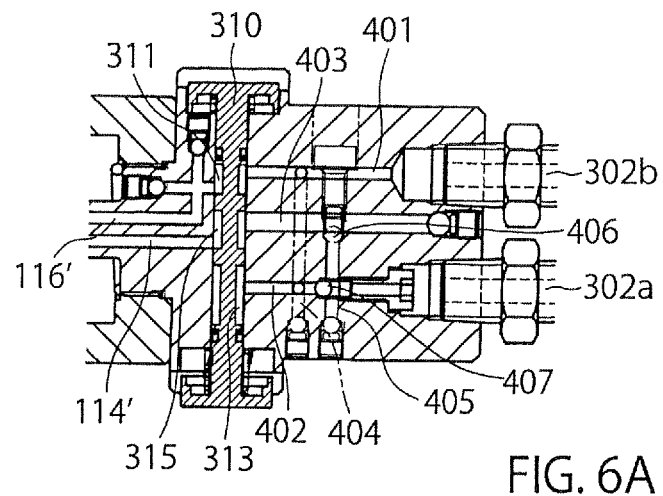
FIG. 6 is a cross sectional view for explaining the structure and the operation of a switch mechanism provided on an end member of the hydraulic hose unit on a side of the end tool unit shown in FIG. 1.

Thus, when the slide valve 310 is positioned at the first position shown in FIG. 6(a), pressurized hydraulic oil, having flown from the hydraulic hose 302a to the second oil passage 402, flows through the fifth oil passage 405 and the circumferential groove 312 into the oil passage 114'. On the other hand, return oil in the oil passage 116' flows through the circumferential groove 311 and the first oil passage 401 into the hydraulic hose 302b.

Figure 6B:
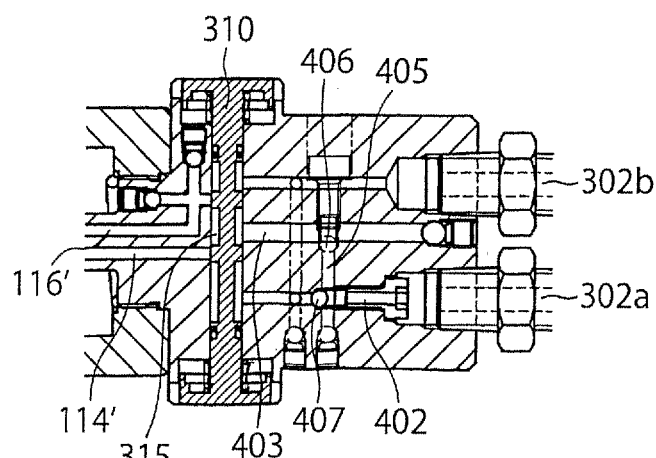

When the slide valve 310 is positioned at the neutral position shown in FIG. 6(b), pressurized hydraulic oil, having flown from the hydraulic hose 302a into the second oil passage 402, flows through the fifth oil passage 405 and the circumferential groove 312, but cannot go farther. Also, hydraulic oil in the oil passages 114' and 116' cannot reach the hydraulic hose 302b.

Figure 6C:
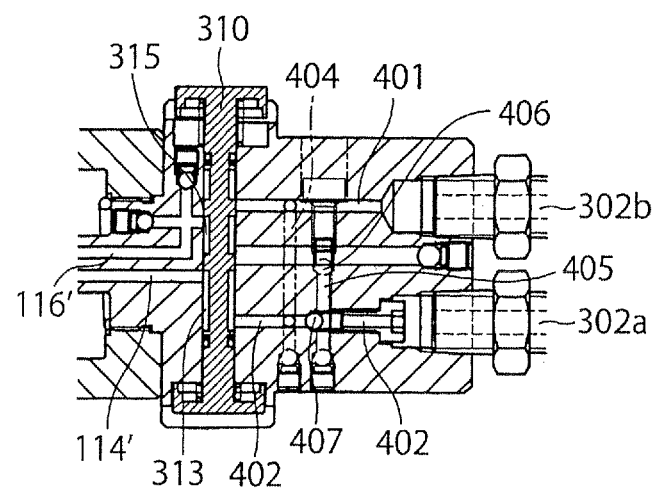

When the slide valve 310 is positioned at the second position shown in FIG. 6(c), pressurized hydraulic oil, having flown from the hydraulic hose 302a into the second oil passage 402, flows through the fifth oil passage 405, the third oil passage 403 and the circumferential groove 312 into the oil passage 116'. On the other hand, return oil in the oil passage 114' flows through the circumferential groove 313, the second oil passage 402, the fourth oil passage 404 and the first oil passage 401 into the hydraulic hose 302b.

Figure 7:
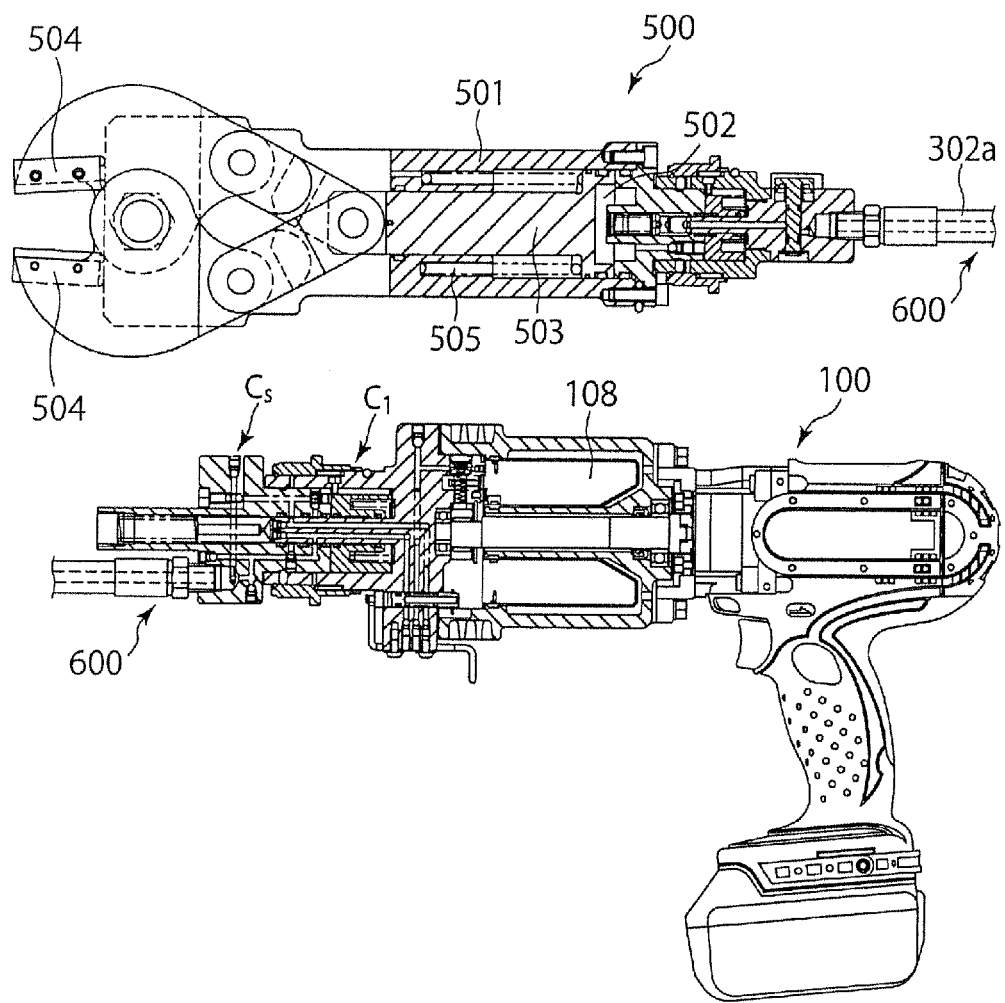
FIG. 7 is a cross sectional view showing the condition in which a single-acting end tool unit is connected with the hydraulic pressure generating unit through a hydraulic hose unit for a single-acting end tool unit.
Figure 8:
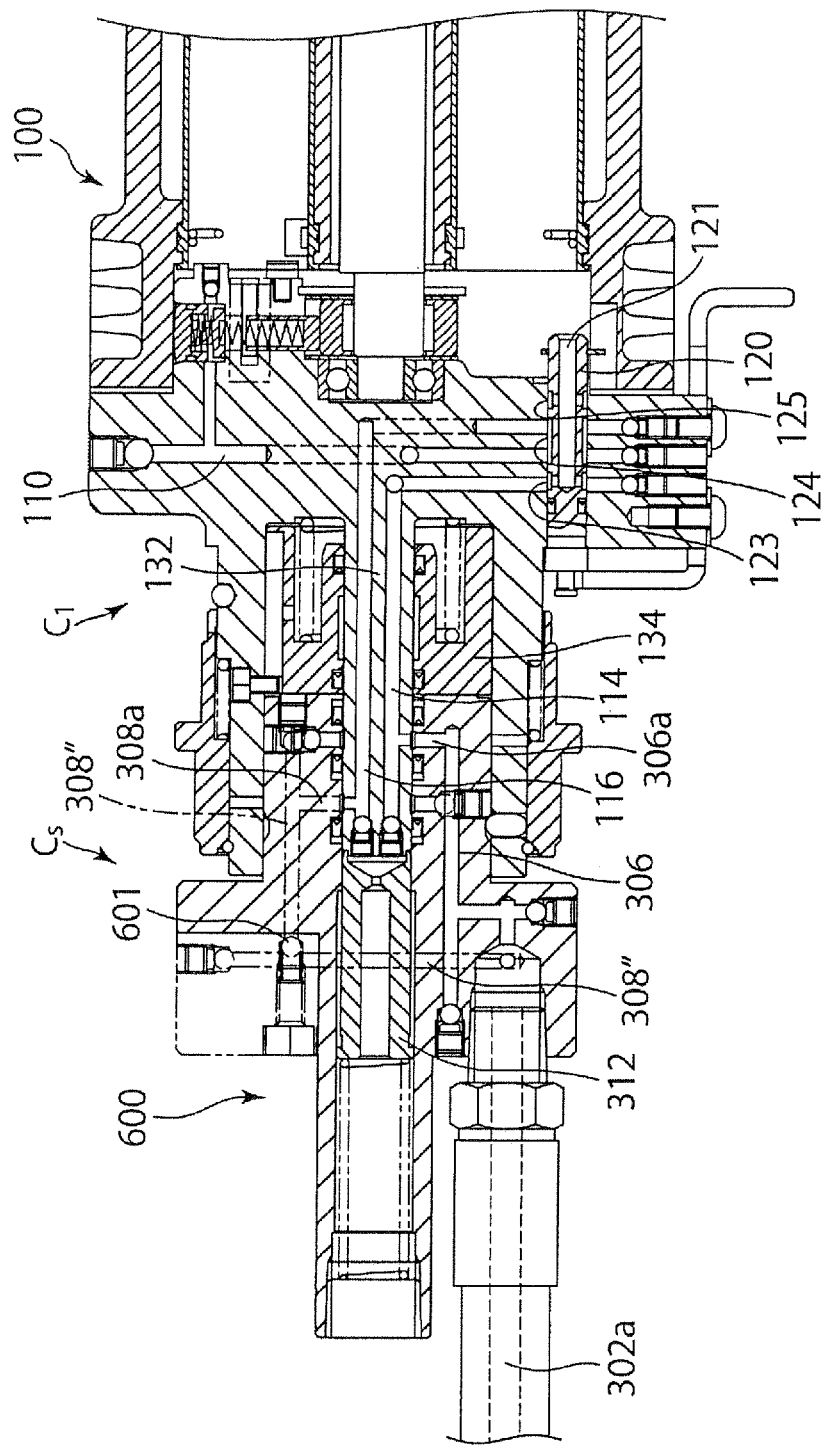
FIG. 8 is a cross sectional view showing the connected condition between the hydraulic hose unit for the single-acting end tool unit and the hydraulic pressure generating unit.

Although the description has been made for the case in which the end tool unit 200 is a double-acting tool unit, a single-acting tool unit can be connected with the hydraulic pressure generating unit 100. FIGS. 7 and 8 show an embodiment in which a single-acting end tool unit 500 is connected with the above-described hydraulic pressure generating unit 100 via a hydraulic hose unit 600 for a single-acting end tool unit. The illustrated single-acting end tool unit 500 is a shear cutter. The end tool unit 500 includes a single-acting hydraulic cylinder 501. When pressurized hydraulic oil is supplied to a chamber 502 on one side of the hydraulic cylinder 501, a piston 503 is moved leftward in the drawings, so that a pair of blades 504 are closed. When the hydraulic pressure in the chamber 502 is released, a return spring 505 pushes back the piston 503, so that the pair of blades 504 are opened.

The hydraulic hose unit 600 includes a joint portion Cs for a single-acting use that can be connected with the joint portion C1 disposed on the hydraulic pressure generating unit 100. The joint portion Cs for a single-acting use differs from the aforementioned joint portion C2 in the following points. A second oil passage 308" in communication with the open end portion 308a is merged with the first oil passage 306. Namely, both the first oil passage 306 and the second oil passage 308" are connected with the single hydraulic hose 302a of the hydraulic hose unit 600 (Note that, in the above-described joint portion C2, the second oil passage 308 is connected with the hydraulic hose 302b). The second oil passage 308" is provided with a check valve 601. The check valve 601 allows hydraulic oil to flow from the open end portion 308a toward the hydraulic hose 302a through the second oil passage 308", but prevents hydraulic oil from flowing from the hydraulic hose 302a toward the open end portion 308a through the second oil passage 308" to return to the first joint portion C1.

FIGS. 7 and 8 show the non-operated condition. Pressurized hydraulic oil having flown from the oil passage 116 in the mandrel 132 (i.e., male member) into the second oil passage 308" pushes the ball of the check valve 601 away to reach the root portion of the hydraulic hose 302, but the hydraulic oil returns to the pump through the first oil passage 306 and the oil passage 114. Thus, no pressurized hydraulic oil is supplied to the single-acting end tool unit 500. When the spool valve 120 is displaced leftward in the drawings from this condition (i.e., the spool valve 120 is moved from the "second position" to the "first position"), hydraulic oil flows from the oil passage 114 in the mandrel 132 (i.e., male member) to reach the root portion of the hydraulic hose 302a through the first oil passage 306, and also attempt to flow into the second oil passage 308". However, since the flow is disturbed by the check valve 601 disposed in the second oil passage 308", pressurized hydraulic oil is supplied to the end tool unit 500 through the hydraulic hose 302a of the hydraulic hose unit 600.

Figure 9A:
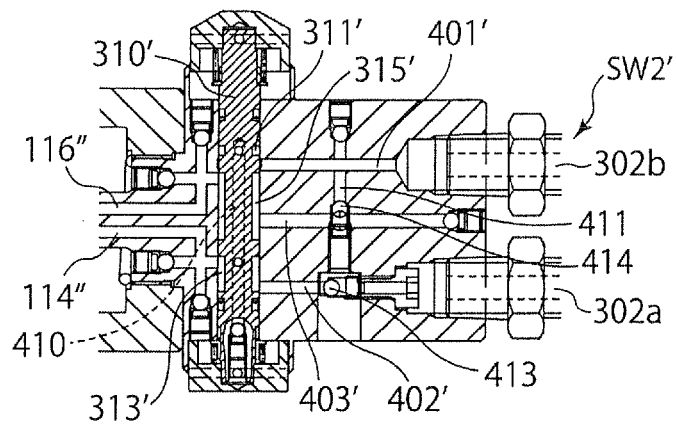
FIG. 9 is a cross sectional view for explaining the structure and the operation of a modified switch mechanism provided on the end member of the hydraulic hose unit.
Figure 9B:
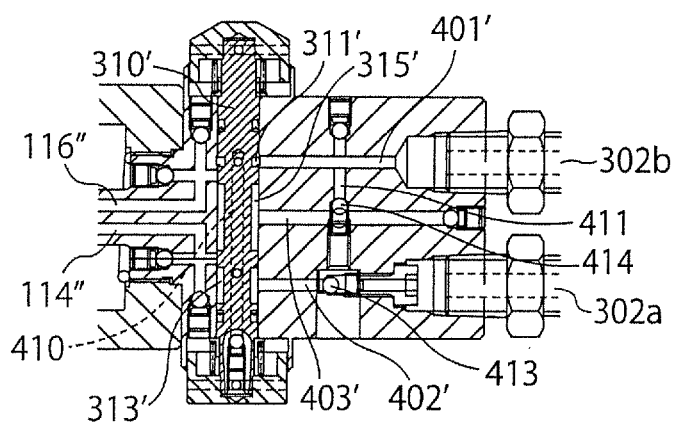

FIG. 9 shows a switch mechanism SW2' which is one modification of the switch mechanism SW2 shown in FIG. 6, and which can be replaced with the switch mechanism SW2 shown in FIG. 6. The switch mechanism SW2' of FIG. 9 functionally differs from the switch mechanism SW2 shown in FIG. 6 in that, at a neutral position shown in FIG. 9(b), pressurized hydraulic oil is not blocked by a valve element, but is returned to an oil return passage. The structure of the switch mechanism SW2' of FIG. 9 is described below. The constituent members shown in FIG. 9 which are identical or similar to the constituent members shown in FIG. 6 are indicated by the same reference numbers but with the dash symbol (') or the two-dash symbol (").

The switch mechanism SW2' includes a slide valve 310' having, in its outer circumference, circumferential grooves 311', 312' and 313'. The slide valve 310' is slidable in the up and down direction in FIG. 9, and can take a first position shown in FIG. 9(a), a neutral position shown in FIG. 9(b) and a second position shown in FIG. 9(c). A central oil passage 410 is provided in the slide valve 310' to extend in the axial direction. Both ends of the central oil passage 410 open into bottoms of the circumferential grooves 311' and 313', so as to connect the circumferential grooves 311' and 313' with each other. The switch mechanism SW2' is provided with a first oil passage 401' in communication with the hydraulic hose 302b, a second oil passage 402' in communication with the hydraulic hose 302a, and a third oil passage 403' disposed between the first oil passage 401' and the second oil passage 402' in parallel with the first oil passage 401' and the second oil passage 402'. The first oil passage 401' and the third oil passage 403' are connected via a fourth oil passage 411. Since a check valve 414 is disposed on a lower end portion of the fourth oil passage 411, hydraulic oil can flow from the first oil passage 401' into the third oil passage 403' but cannot flow reversely. Since the second oil passage 402' is provided with a check valve 413, hydraulic oil can flow from the left to the right in FIG. 9 through the check valve 413 but cannot flow reversely. The switch mechanism SW2' shown in FIG. 9 is designed on the assumption that it is used under the condition that the switch mechanism SW1 is set such that pressurized hydraulic oil is supplied to the hydraulic hose 302b (i.e., the hydraulic hose 302a is used as a return line).

When the slide valve 310' is positioned at the first position shown in FIG. 9(a), pressurized hydraulic oil, having flown from the hydraulic hose 302b into the first oil passage 401, flows through the fourth oil passage 411 into the third oil passage 403', and further flows through the circumferential groove 312' of the slide valve 310' into the oil passage 116". On the other hand, return oil in the oil passage 114" flows through the circumferential groove 313' and the second oil passage 402 into the hydraulic hose 302a.

When the slide valve 310' is positioned at the neutral position shown in FIG. 9(b), pressurized hydraulic oil, having flown from the hydraulic hose 302b into the first oil passage 401, flows sequentially through the circumferential groove 312', the central oil passage 410 and the circumferential groove 313' of the slide valve 310' into the second oil passage 402', and further flows into the hydraulic hose 302a.

Figure 9C:
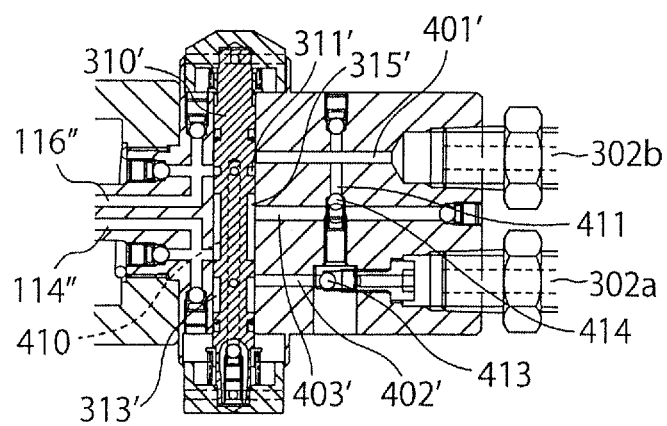

When the slide valve 310' is positioned at the second position shown in FIG. 9(c), pressurized hydraulic oil, having flown from the hydraulic hose 302b into the first oil passage 401, flows sequentially through the fourth oil passage 411, the third oil passage 403' and the circumferential groove 312' of the slide valve 310' into the oil passage 114". On the other hand, return oil in the oil passage 116" flows sequentially through the circumferential groove 311', the central oil passage 410 and the circumferential groove 313' of the slide valve 310' into the second oil passage 402', and further flows into the hydraulic hose 302a.

Differently from the switch mechanism SW2 of FIG. 6, in the switch mechanism SW2' of FIG. 9, pressurized hydraulic oil is not blocked by the slide valve 310' positioned in its neutral position. This reduces the load on the pump 308, and the slide valve 310' can be smoothly moved from the neutral position to the first position or to the second position.

DESCRIPTION OF REFERENCE NUMERALS

C, C' Hydraulic joint structure
C1, C1' First joint portion
C2, C2' Second joint portion
Cs Joint portion for single-acting use
100 Hydraulic pressure generating unit
114 First oil passage of first joint portion
114a First open end portion
116 Second oil passage of second joint portion
116a Second open end portion
132 Male member (Mandrel)
134 Ring member
142 Communication groove in inner circumference of ring member
200 End tool unit
208 Tool (Blade)
300 Hydraulic hose unit
304 Female member (Sleeve)
306 First oil passage of second joint portion
306b Circumferential groove
308 Second oil passage of second joint portion
308a Second open end portion
308b Circumferential groove
312 Cylindrical member (Rod member)
500 End tool unit for single-acting use
600 Hydraulic hose unit for end tool unit for single-acting use

The invention claimed is:

1. A hydraulic joint structure comprising a first joint portion and a second joint portion releasably connected with the first joint portion, wherein:
the first joint portion has a first oil passage and a second oil passage;
the second joint portion has a first oil passage and a second oil passage;
the first joint portion has a male member having a cylindrical shape;
the second joint portion has a female member with a cylindrical hole into which the male member of the first joint portion is inserted;
the first oil passage of the first joint portion extends in the male member of the first joint portion and has a first open end portion opening into an outer circumference of the male member at a first axial position of the male member;
the second oil passage of the first joint portion extends in the male member of the first joint portion and has a second open end portion opening into the outer circumference of the male member at a second axial position of the male member;
the first oil passage of the second joint portion extends in the female member of the second joint portion and has a first open end portion opening into an inner circumference of the female member at a first axial position of the female member;
the second oil passage of the second joint portion extends in the female member of the second joint portion and has a second open end portion opening into the inner circumference of the female member at a second axial position of the female member;
when the male member is inserted into the cylindrical hole of the female member to connect the first joint portion and the second joint portion with each other, the first open end portion of the first oil passage of the male member and the first open end portion of the first oil passage of the female member are connected at a first axial position of said hydraulic joint structure corresponding to the first axial position of the male member and the female member to form a first connection, and the second open end portion of the second oil passage of the male member and the second open end portion of the second oil passage of the female member are connected at a second axial position of said hydraulic joint structure corresponding to the second axial position of the male member and the female member to form a second connection;
the first joint portion includes a ring member, which has a cylindrical hole into which the male member of the first joint portion is inserted and which is movable between an oil passage-covering position and a retracted position along an axial direction of the male member,
wherein:
the ring member is biased toward the oil passage-covering position by a spring;
the ring member has an inner circumference provided therein with a communication groove;
when the first joint portion and the second joint portion are separated from one another, the ring member is positioned at the oil passage-covering position to connect via the communication groove the first open end portion of the first oil passage of the male member and the second open end portion of the second oil passage of the male member; and
when the first joint portion and the second joint portion are connected with each other, the second joint portion pushes the ring member into the retracted position against a force of the spring.

2. The hydraulic joint structure according to claim 1, wherein the second joint portion further includes a cylindrical member provided in the cylindrical hole of the female member of the second joint portion so as to be axially movable between an oil passage-covering position and a retracted position,
wherein:
the cylindrical member is biased toward the oil passage-covering position by a spring;
when the first joint portion and the second joint portion are separated from one another, the cylindrical member is positioned at the oil passage-covering position of the cylindrical member to close the first open end portion of the first oil passage of the female member and the second open end portion of the second oil passage of the female member; and
when the first joint portion and the second joint portion are connected with each other, the male member pushes the cylindrical member into the retracted position of the cylindrical member against a force of the spring.

3. The hydraulic joint structure according to claim 1, wherein:
the first open end portion of the male member and the first open end portion of the female member are connected through a first circumferential groove, the first circumferential groove is one extending in the outer circumference of the male member in a circumferential direction at the first axial position of the male member, or one extending in the inner circumference of the male member in a circumferential direction at the first axial position of the female member; and
the second open end portion of the male member and the second open end portion of the female member are connected through a second circumferential groove, the second circumferential groove is one extending in the outer circumference of the male member in a circumferential direction at the second axial position of the male member, or one extending in the inner circumference of the female member in a circumferential direction at the second axial position of the female member.

4. A first joint portion which is to be releasably connected with a second joint portion to constitute a hydraulic joint structure the first joint portion comprising:
a male member having a cylindrical shape and having a first oil passage and a second oil passage extending therethrough,
the first oil passage having a first open end portion opening into an outer circumference of the male member at a first axial position of the male member, and
the second oil passage having a second open end portion opening into the outer circumference of the male member at a second axial position of the male member;
a ring member, which has a cylindrical hole into which the male member is inserted and which is movable between an oil passage-covering position and a retracted position along an axial direction of the male member, the ring member having an inner circumference provided therein with a communication groove; and
a spring that biases the ring member toward the oil passage-covering position
at which the first open end portion of the first oil passage of the male member and the second open end portion of the second oil passage of the male member are connected via the communication groove, wherein the ring member can be pushed against a force of the spring toward the retracted position at which the first and second open end portions are not covered with the ring member.

5. A hydraulic pressure generating unit comprising:
a hydraulic pump;
an oil discharge passage and an oil return passage connected with the hydraulic pump;
a first joint portion; and
a switch mechanism configured to switch between a first condition in which the oil discharge passage is connected with a first oil passage of the first joint portion while the oil return passage is connected with a second oil passage, and a second condition in which the oil discharge passage is connected with the second oil passage of the first joint portion while the oil return passage is connected with the first oil passage,
wherein the first joint portion includes:
a cylindrical male member having the first oil passage and the second oil passage extending therethrough, the first oil passage having a first open end portion opening into an outer circumference of the male member at a first axial position of the male member, and the second oil passage having a second open end portion opening into the outer circumference of the male member at a second axial position of the male member;
a ring member, which has a cylindrical hole into which the male member is inserted and which is movable between an oil passage-covering position and a retracted position along an axial direction of the male member, the ring member having an inner circumference provided therein with a communication groove; and
a spring that biases the ring member toward the oil passage-covering position at which the first open end portion of the first oil passage of the male member and the second open end portion of the second oil passage of the male member are connected via the communication groove, wherein the ring member can be pushed against a force of the spring toward the retracted position at which the first and second open end portions are not covered with the ring member.

6. A hydraulic hose unit comprising:
a first hydraulic hose and a second hydraulic hose;
a first joint portion, which is connected with a first end of the first hydraulic hose and with a first end of the second hydraulic hose; and
a second joint portion, which is connected with a second end of the first hydraulic hose and with a second end of the second hydraulic hose,
wherein the first joint portion includes:
a cylindrical male member having a first oil passage and a second oil passage extending therethrough, the first oil passage and the second oil passage being in fluid communication with the first hydraulic hose and the second hydraulic hose, respectively, the first oil passage having a first open end portion opening into an outer circumference of the male member at a first axial position of the male member, and the second oil passage having a second open end portion opening into the outer circumference of the male member at a second axial position of the male member;
a ring member, which has a cylindrical hole into which the male member is inserted and which is movable between an oil passage-covering position and a retracted position along an axial direction of the male member, the ring member having an inner circumference provided therein with a communication groove; and
a spring that biases the ring member toward the oil passage-covering position at which the first open end portion of the first oil passage of the male member and the second open end portion of the second oil passage of the male member are connected via the communication groove, wherein the ring member can be pushed against a force of the spring toward the retracted position at which the first and second open end portions are not covered with the ring member.

7. A hydraulically-actuated device comprising:
a first unit having a first joint portion; and
a second unit having a second joint portion, which is configured to be releasably connected with the first joint portion to constitute a hydraulic joint structure comprising the first joint portion and the second joint portion,
wherein:
the first joint portion has a first oil passage and a second oil passage;
the second joint portion has a first oil passage and a second oil passage;
the first joint portion has a male member having a cylindrical shape;
the second joint portion has a female member with a cylindrical hole into which the male member of the first joint portion is inserted;
the first oil passage of the first joint portion extends in the male member of the first joint portion and has a first open end portion opening into an outer circumference of the male member at a first axial position of the male member;
the second oil passage of the first joint portion extends in the male member of the first joint portion and has a second open end portion opening into the outer circumference of the male member at a second axial position of the male member;
the first oil passage of the second joint portion extends in the female member of the second joint portion and has a first open end portion opening into an inner circumference of the female member at a first axial position of the female member;
the second oil passage of the second joint portion extends in the female member of the second joint portion and has a second open end portion opening into the inner circumference of the female member at a second axial position of the female member;
when the male member is inserted into the cylindrical hole of the female member to connect the first joint portion and the second joint portion with each other, the first open end portion of the first oil passage of the male member and the first open end portion of the first oil passage of the female member are connected at a first axial position of said hydraulic joint structure corresponding to the first axial position of the male member and the female member to form a first connection, and the second open end portion of the second oil passage of the male member and the second open end portion of the second oil passage of the female member are connected at a second axial position of said hydraulic joint structure corresponding to the second axial position of the male member and the female member to form a second connection;
the first joint portion includes a ring member, which has a cylindrical hole into which the male member of the first joint portion is inserted and which is movable between an oil passage-covering position and a retracted position along an axial direction of the male member,
wherein:
the ring member is biased toward the oil passage-covering position by a spring;

the ring member has an inner circumference provided therein with a communication groove;
when the first joint portion and the second joint portion are separated from one another, the ring member is positioned at the oil passage-covering position to connect via the communication groove the first open end portion of the first oil passage of the male member and the second open end portion of the second oil passage of the male member; and
when the first joint portion and the second joint portion are connected with each other, the second joint portion pushes the ring member into the retracted position against a force of the spring.

8. The hydraulically-actuated device according to claim 7,
wherein the first unit is a hydraulic pressure generating unit including:
a hydraulic pump;
an oil discharge passage and an oil return passage connected with the hydraulic pump; and
a switch mechanism configured to switch between a first condition in which the oil discharge passage is connected with the first oil passage of the first joint portion while the oil return passage is connected with the second oil passage, and a second condition in which the oil discharge passage is connected with the second oil passage of the first joint portion while the oil return passage is connected with the first oil passage, and
wherein the second unit is an end tool unit including:
a double-acting hydraulic cylinder having a first chamber and a second chamber, the first oil passage of the second joint portion is connected with the first chamber of the hydraulic cylinder while the second oil passage of the second joint portion is connected with the second chamber of the hydraulic cylinder; and
a tool that operates in an interlocked manner with an operation of the hydraulic cylinder.

9. The hydraulically-actuated device according to claim 7,
wherein the second unit has a first joint portion having the same configuration as that of the first joint portion of the first unit, the hydraulically-actuated device further comprising a third unit having a second joint portion, the second joint portion of the third unit being configured to be releasably connected with the first joint portion of the second unit and having the same configuration as that of the second joint portion of the second unit,
wherein the first unit is a hydraulic pressure generating unit including:
a hydraulic pump;
an oil discharge passage and an oil return passage connected with the hydraulic pump; and
a switch mechanism configured to switch between a first condition in which the oil discharge passage is connected with the first oil passage of the first joint portion while the oil return passage is connected with the second oil passage, and a second condition in which the oil discharge passage is connected with the second oil passage of the first joint portion while the oil return passage is connected with the first oil passage,
wherein the second unit is a hose unit including a first hydraulic hose and a second hydraulic hose, wherein the first joint portion of the second unit is connected with a first end of the first hydraulic hose and with a first end of the second hydraulic hose, and wherein the second joint portion of the second unit is connected with a second end of the first hydraulic hose and with a second end the second hydraulic hose, wherein the third unit is an end tool unit including:

a double-acting hydraulic cylinder having a first chamber and a second chamber, the first oil passage of the second joint portion of the third unit is connected with the first chamber of the hydraulic cylinder while the second oil passage of the second joint portion of the third unit is connected with the second chamber of the hydraulic cylinder; and a tool that operates in an interlocked manner with an operation of the hydraulic cylinder, and wherein when the first, second and third units are connected serially, the first oil passage of the first unit is in fluid communication with the first oil passage of the third unit via the first hydraulic hose, and the second oil passage of the first unit is in fluid communication with the second oil passage of the third unit via the second hydraulic hose.

* * * * *